(12) United States Patent
Ramdoss et al.

(10) Patent No.: US 12,481,662 B2
(45) Date of Patent: Nov. 25, 2025

(54) VISUALIZING DATA PROVIDED BY EXTERNAL SOURCES

(71) Applicant: AVEVA Software, LLC, Lake Forest, CA (US)

(72) Inventors: Arun Kumar Nattamai Ramdoss, Lake Forest, CA (US); Vinay T. Kamath, Lake Forest, CA (US); Alexander Vasilyevich Bolotskikh, Lake Forest, CA (US); Jose Lourenco Teodoro, Lake Forest, CA (US)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 18/598,204

(22) Filed: Mar. 7, 2024

(65) Prior Publication Data
US 2025/0284696 A1    Sep. 11, 2025

(51) Int. Cl.
*G06F 16/2455* (2019.01)
*G06F 16/2453* (2019.01)
*G06F 16/25* (2019.01)
*G06F 16/26* (2019.01)

(52) U.S. Cl.
CPC .... *G06F 16/24568* (2019.01); *G06F 16/2453* (2019.01); *G06F 16/258* (2019.01); *G06F 16/26* (2019.01)

(58) Field of Classification Search
CPC .. G06F 16/24568; G06F 16/26; G06F 16/258; G06F 16/2453

USPC .......................................... 705/706; 707/706
See application file for complete search history.

(56) References Cited

U.S. PATENT DOCUMENTS

| | | | |
|---|---|---|---|
| 2011/0016379 A1* | 1/2011 | McColl | G06F 40/18 715/219 |
| 2020/0366962 A1* | 11/2020 | Lim | H04N 21/44008 |
| 2020/0404059 A1* | 12/2020 | Feiguine | H04L 67/51 |
| 2024/0362289 A1* | 10/2024 | Morrison | G06F 16/2456 |

* cited by examiner

*Primary Examiner* — Baoquoc N To
(74) *Attorney, Agent, or Firm* — Dergosits & Noah LLP; Todd A. Noah (57) ABSTRACT

Data provided by external sources is visualized. A user interface for a data visualization platform receives a query from a client, and forwards it to an application programming interface for an internal data source provider. The application programming interface ("API") forwards the query to a retrieval service, which identifies an external data source provider specified by a tag in the query and forwards the query to the external data source provider. The retrieval service retrieves a content stream from the external data source provider in response to the query being enhanced by a retrieval mode supported by the external data source provider or the retrieval service. The retrieval service processes the content stream, including identifying a format of the content stream, and forwards the processed content stream to the API, which forwards the processed content stream to the user interface, which visualizes the processed content stream on the client.

20 Claims, 3 Drawing Sheets

VISUALIZING DATA PROVIDED BY EXTERNAL SOURCES

BACKGROUND

A data visualization platform may be a combination of hardware and/or software that collects a large amount of data for an enterprise, and that creates easy-to-understand visual representations of the data to enable the enterprise's operators to quickly understand the data and gain important insights into otherwise difficult-to-identify relationships, correlations, patterns, trends, variations, outliers, and unusual groupings within the data. The data visualization platform can use visual formats such as tables, charts, graphs, plots, maps, figures, matrices, and gauges which are static, dynamic, or interactive, which are accompanied by supporting texts such as labels and titles, and which may be combined in a dashboard. The data visualization platform can also analyze the data and communicate the analysis insights to assist the enterprise's operators in monitoring performance, solving problems, making decisions, and taking actions to create business value, but without having to learn any sophisticated methods to be able to interpret the visualizations of the data.

A data visualization platform has a back-end component, which may be referred to as a historian, which can use a contract/specification of information provided by an enterprise to identify the format of an enterprise's data and how to enhance the capabilities of retrieving the enterprise's data for subsequent visualization. Once the data's format has been identified, the back-end historian collects a stream of the enterprise's formatted data into a cloud computing environment, processes the streamed data, and typically analyzes the processed data. Then the front-end component, the user interface, of the data visualization platform can visualize the processed (and typically analyzed) data for any of the enterprise employees at any location, and respond to these employees' queries with a retrieved stream of data. If the enterprise provides access to any new data sources, the back-end historian verifies the format of the data streamed from any new data sources, which enables the subsequent visualization and retrieval of a stream of data from any new data sources, along with the streams of data from any previously existing sources. Since the data visualization platform provided the contract/specification that the enterprise used to submit the information that the internal back-end historian uses to identify the format of the enterprise's data and how to enhance the capabilities of retrieving the enterprise's data, the enterprise's data is referred to as internal data and the enterprise is referred to as an internal data source.

An enterprise may want to use a front-end user interface to visualize data that is streamed from an internal data source and from other data sources via other back-end historians, such as DataHub or Manufacturing Execution System (MES). For example, AVAEA's data visualization platform uses the contract/specification information from BigBiz Corporation to visualize and retrieve the steamed data from BigBiz's many factories, then a BigBiz executive schedules to send an engineer to operate a factory currently owned and operated by Acme Inc., and to evaluate whether to purchase and operate Acme's factory. Since Acme has not submitted the contract/specification information that AVAEA's back-end historian needs to identify the format of Acme's factory data and how to enhance the capabilities of retrieving Acme's factory data, AVAEA's front-end user interface cannot visualize Acme's factory data, even if AVAEA's back-end historian could gain access to Acme's factory data from the DataHub or MES back-end historians. Consequently, Acme's factory data is referred to as external data and Acme's factory is referred to as an external data source, and BigBiz Corporation faces a challenge in evaluating whether to purchase and operate Acme's factory because of the need for visualizing data provided by external sources.

DETAILED DESCRIPTION

Designed to overcome the challenges of visualizing data provided by external sources, one proposed solution was to import a stream of external data from an external data source, and persist that imported stream of external data in a back-end historian of a data visualization platform, where the format of the external data could be identified to enable visualization by the data visualization platform. However, this proposed solution creates additional challenges, such as the need to recreate an existing data access security system and the need to persist data to storage to be able to visualize the data, which creates an inefficient use of computer resources. For example, if some of Acme's factory data points require high security levels to access, after an administrator replicates an instance of the Acme factory data into the AVEVA's back-end historian, which is an internal data source, the internal back-end historian would have to duplicate all of the authentication and authorization information required to access all of the Acme factory data points. Since the platform users may seldom, or even never, retrieve Acme's highest security data points, recreating the data access security system for the Acme factory's back-end historian could be an even more inefficient use of computer resources.

Embodiments of this disclosure enable the visualization of data from external sources. A retrieval service receives queries, and determines whether any of these queries are intended for any external data sources instead of the internal data source. If a query is intended for an external data source, the high-level retrieval redirects the query to its intended external data source, retrieves the streaming data directly from any external data source, identifies the format of the streaming data for visualization, without persisting the streaming data, and provides the streaming data for visualization and analysis. The high-level retrieval enables a single data visualization platform, such as an AVEVA data visualization platform or an AVEVA Insight platform, to seamlessly integrate with any number of external data source providers, such as DataHub or Manufacturing Execution System (MES), or any on-premises internal data source. Platform users can continue to use the AVEVA data visualization platform the same way, irrespective of the data source, retaining all the capabilities of the AVEVA data visualization platform, such as the charts with different retrieval modes, summary queries, expressions, units of measure (UOM), guided analytics, and advanced analytics, with no change on the client side.

Unlike the prior art's proposed solution, which required replicating the data of an external data source to an internal data source before being able to visualize any of the replicated data, the claimed solution does not require storing any of the external data source's data in persistent storage prior to platform users being able to visualize or retrieve any of the external data source's data. While the claimed system can persist some data after visualization, the persisted data is the configuration of the streamed content, which includes the data's tags (such as the output temperature of boiler #1), time frame, and an engineer/operator's identified problem, but does not include the value of any data point. Even if some of the other operators do not have permission to view all data point values, they can still use the configuration of the streamed content to visualize all of their permitted data upon request.

Furthermore, industrial time series data points are typically refreshed frequently, such as every second, such that millions of values for the time series data points may be accumulated during a relatively short time period, yet the vast majority of these values remain within normal operational parameters. Consequently, the proposed solution required that massive amounts of external data values that seldom extend beyond their thresholds be imported into the internal data storage, and persisted before any of the external data values could be visualized. Such a visualization requirement would consume significant amounts of processor time writing data to rapidly filled storage volumes, thereby once again resulting in an inefficient use of computer resources.

Embodiments herein enable visualizing data provided by external sources. A user interface for a data visualization platform receives a query from a client, and forwards the query to an application programming interface for an internal data source provider. The application programming interface forwards the query to a retrieval service, which identifies an external data source provider specified by a tag in the query, and forwards the query to the external data source provider. The retrieval service retrieves a content stream from the external data source provider in response to the query being enhanced by a retrieval mode supported by the external data source provider or the retrieval service. The retrieval service processes the content stream by identifying a format of the content stream, and forwards the processed content stream to the application programming interface, which forwards the processed content stream to the user interface, which visualizes the processed content stream on the client.

For example, a BigBiz executive enters a query for the values of the time series data points from Acme's factory into the front-end user interface for an AVEVA data visualization platform, and the front-end user interface forwards the query to an application programming interface (API) which is used to query an AVEVA back-end historian, which is an internal data source provider. Then the API forwards the query for the Acme factory data to a retrieval service, which identifies Acme's DataHub historian, which is the external data source provider specified by a tag in the query, and forwards the query for the Acme factory data to Acme's DataHub historian. The retrieval service enhances the capability of the query by implementing the integral retrieval mode while retrieving a data stream for the Acme factory data from Acme's DataHub historian because analysis of Acme's contract/specification information indicates that Acme's DataHub historian does not support the integral retrieval mode. The retrieval service processes the data stream for the Acme factory data by identifying the format of the data stream, and forwards the identified data stream to the API, which forwards the identified data stream to the front-end user interface of the AVEVA data visualization platform, which visualizes the data stream for the Acme factory data for the BigBiz executive. The visualized data stream for the Acme factory data enables the BigBiz executive to analyze all the data required to make a well-informed evaluation of whether to purchase and operate Acme's factory.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "an embodiment" or "the embodiment" in various places in the specification do not necessarily all refer to the same embodiment.

Figure 1:
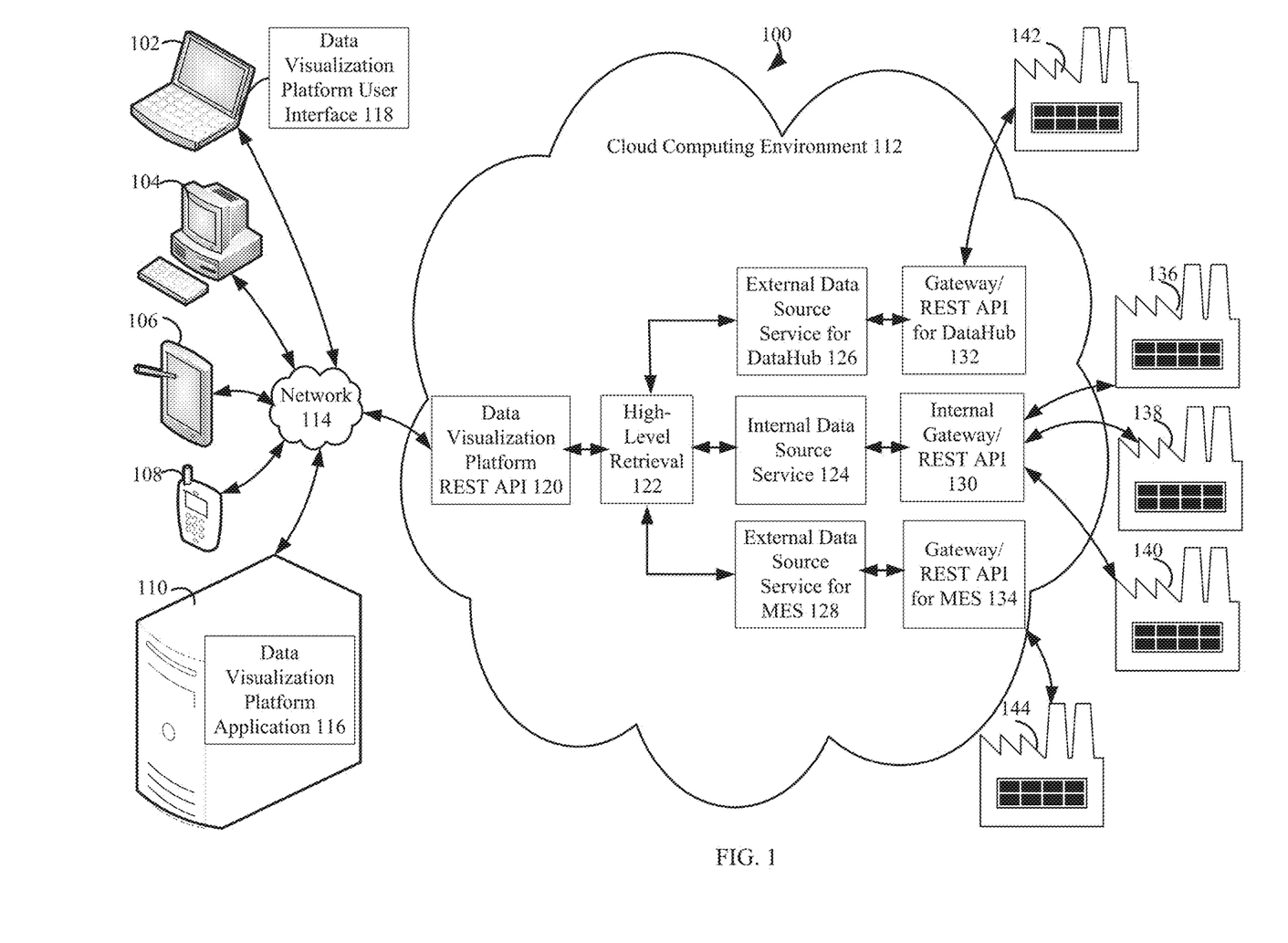
FIG. 1 illustrates a block diagram of an example system for visualizing data provided by external sources, under an embodiment.

FIG. 1 illustrates a block diagram of an example system 100 for visualizing data provided by external sources, under an embodiment. As shown in FIG. 1, the system 100 may illustrate a cloud computing environment in which data, applications, services, and other resources are stored and delivered through shared data centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, a fourth client 108, and a server 110 and a cloud computing environment 112 that may be provided by a hosting company. The clients 102-108, the server 110, and the cloud computing environment 112 communicate via a network 114. Even though FIG. 1 depicts the first client 102 as a laptop computer 102, the second client 104 as a desktop computer 104, the third client 106 as a tablet computer 106, and the fourth client 108 as a smart phone 108, each of the system components 102-110 may be any type of computer system, and may each be substantially similar to the hardware device 400 depicted in FIG. 3 and described below.

The server 110 can host and execute a data visualization platform application 116 to create a data visualization platform, which may be accessed via a data visualization platform user interface 118, which may reside on the client 102, as depicted by FIG. 1, and/or reside on any of the clients 104-108. Although FIG. 1 depicts all of the data visualization platform application 116 residing completely on the server 110, any or all of the data visualization platform application 116 may reside completely on the clients 102-108, or in any combination of partially on the clients 102-108, partially the server 110, and/or partially on another server which is not depicted in FIG. 1.

The data visualization platform user interface 118 enables users to login to the data visualization platform application 116, search for resources such as assets and tags, add resources to content for data exploration, configure alerts, view graphical contents, and apply analytics models to data. A tag can be an identifier or a label of a time series data point, and can specify the data source provider that created the tag and stores the tag's information. When queried by the data visualization platform user interface 118, the data visualization platform application 116 calls a data visualization platform Representational State Transfer (REST) application programming interface (API) 120, which provides an end-point for search and data retrieval, and which may be implemented as a microservice in the cloud computing environment 112. Upon being called, the data visualization platform REST API 120 calls a high-level retrieval 122 (service), which may also be implemented as a retrieval microservice or a retrieval service in the cloud computing environment 112.

Although a user of the data visualization platform application 116 may already be able to access the internal data source service 124, the user may need to use one of the clients 102-108 to establish a preliminary connection with the external data source services 126 and/or 128, obtain data access information such as user names and passwords to be able to access the external data source services 126 and/or 128, obtain a list of the time series data points which the user can request via the external data source services 126 and/or 128, and establish a contract/specification for the external data source services 126 and/or 128. The high-level retrieval 122 (service) may be responsible for forwarding queries to their respective data sources, splitting the data queries as needed, processing the data based on retrieval modes, and returning the data in time order. For example, the high-level retrieval 122 (service) may forward a first query for internal data to the internal data source service 124, forward a second query for external data to the external data source service for MES 128, and forward a third query for both internal data and external data as split queries to the internal data source service 124 and the external data source service for DataHub 126, respectively. In another example, the high-level retrieval 122 (service) may process the response to the second query for the best fit retrieval mode applied to some external data without applying the algorithm for the best fit retrieval mode to the response to the second query because the high-level retrieval 122 (service) had previously discovered that the best fit retrieval mode is already available to be provided by the external data source service for MES 128. In yet another example, the high-level retrieval 122 (service) may forward the merged data streams for time series data points from the internal data source service 124 and the external data source service for DataHub 126, with the merging of the data steams for the time series data points being based on the corresponding times for the merged data streams.

The high-level retrieval 122 (service) forwards queries to their respective data source providers by forwarding the queries to the corresponding data source services, such as the internal data source service 124, the external data source service for DataHub 126, and the external data source service for MES 128, each of which may be implemented as a corresponding microservice in the cloud computing environment 112. The data source services 124-128 can expose end-points for data, metadata, group, discovery, and data subscriptions. The data source services 124-128 can receive data, via their corresponding gateway/Representational State Transfer (REST) application programming interfaces (APIs) 130, 132 and 134, which may be referred to as historians 130-134. For example, the internal data source service 124 receives data from the internal gateway/REST API's 130, the external data source service for DataHub 126 receives data from the gateway/REST API's for DataHub 132, and the external data source service for MES 128, receives data from the gateway/REST API's for MES 134. The internal gateway/REST API's 130 receives data from the data sources 136 138, 140, the gateway/REST API's for DataHub 132 receives data from the data source 142, and the gateway/REST API's for MES 134 receives data from the data source 144. FIG. 1 depicts the data sources 136 138, 140, 142, and 144 as factories 136-144.

A cloud gateway application, which may be parts of the gateway/REST API's 130, 132, and 134, or the historians 130-134, exposes an interface backed by a service offered by a cloud platform. Any request sent to the interface exposed by the cloud gateway application ends up being sent to a service offered by the cloud platform. The cloud gateway application can use cloud service application programming interfaces (API's), such as Simple Object Access Protocol (SOAP) and Representational State Transfer (REST).

The external data source services 126-128 can adhere to and implement the external data source provider contract, which may be referred to as a specification, protocols or rules. The contact/specification exposes a group endpoint through which an external data source provider can specify its grouping of tags/content streams so that a query can optimize the request payload for retrieving the tags/content streams based on any retrieval modes and other criteria. This is a smart way of reducing the number of queries or requests to the external data source provider. The contract/specification also exposes the discovery endpoint mechanism through which an external data source provider can specify what it can support, such as supported retrieval modes.

For example, the high-level retrieval 122 (service) submitted a discovery query to discover the contract/specification information for the external data source provider for Acme Corporation, which specified what Acme's DataHub historian 132 supports, such as the supported retrieval modes. The contract/specification information for Acme's DataHub historian 132 includes a first list of the specific tags for the Acme factory data which store their retrievable information within a first partition, a second list of the specific tags for the Acme factory data which store their retrievable information within a second partition, and a third list of the specific tags for the Acme factory data which store their retrievable information within a third partition. Consequently, the high-level retrieval 122 (service) optimizes the query for some of the Acme factory data by splitting the query into a first query that requests a group of data that is stored within the first partition, a second query that requests a group of data that is stored within the second partition, and a third query that requests a group of data that is stored within the third partition. Although this query optimization describes an optimization based on grouping of data, this grouping is only an example, and many other option for optimizing queries based on retrieval information discovered from an external data source contract/specification will become apparent to one skilled in the art.

If a query requests an external data source service 126 and/or 128 to use a retrieval mode when generating a response to the query, the high-level retrieval 122 (service) analyzes the contract/specification for the queried external data source service 126 and/or 128 to determine whether or not the queried external data source service 126 and/or 128 supports the identified retrieval mode. If the queried external data source service 126 and/or 128 supports the identified retrieval mode, then the high-level retrieval 122 (service) includes the identified retrieval mode in the query to request the queried external data source service 126 and/or 128 to use the identified retrieval mode when generating a response to the query. If the queried external data source service 126 and/or 128 does not support the identified retrieval mode, then the high-level retrieval 122 (service) excludes the identified retrieval mode from the query, and applies the identified retrieval mode itself to add this otherwise unsupported capability when generating a response to the query.

Examples of retrieval modes that are supported by the data visualization platform application 116 and which may or may not be supported by the external data source services 126 and/or 128 include the average retrieval mode, the integral retrieval mode, and the interpolated retrieval mode. The algorithm for the average retrieval mode uses a time-weighted average to calculate the value to be returned for each retrieval cycle, while the algorithm for a statistical average divides the sum of the data values by the number of the data values. The algorithm for the integral retrieval mode integrates a graph of the values for a data point between cycle boundaries, which calculates the volume for the data point, which is useful for estimating a product flow in gallons during a time period. The algorithm for the interpolated retrieval mode functions similar to a cyclic retrieval, except that interpolated values are used if there is no actual data point stored at a cycle boundary. The algorithm for the best fit retrieval mode divides the total time for the query into even sub-periods, and then for each sub-period returns up to five values: the first value in the period, the last value in the period, the minimum value in the period with its actual time, the maximum value in the period with its actual time, and the first "exception" (non-good quality) in the period. Other retrieval modes include retrieval modes referred to as minimum, maximum, slope, counter, value state, round trip, edge detection, and bounding value.

The data visualization platform application 116 can also support querying multiple stream data with time merge. The data visualization platform application 116 can further support multiple complex data streams, each of which is a stream with multiple value properties, such as weather-related data points which have the properties for temperature, humidity, barometric pressure, wind speed, and wind direction.

Cloud services may be accessed through a co-located cloud computer service, a web service application programming interface (API), and/or by applications that utilize a web service API, such as a cloud desktop application, a cloud gateway application, or Web-based content management systems. The cloud computing environment 112 may be implemented by a cloud platform as a service, such as Heroku, which supports several programming languages. The system 100 may implement the cloud components 120-134 in the cloud computing environment 112 by using a container-orchestration system, such as Kubernetes, for automating computer application deployment, scaling, and management.

Each of the cloud components 120-134, which are backed by a cloud platform and provide a service, may have an interface that is exposed as a microservice. Microservices are based on a software development technique, and a variant of the service-oriented architecture style that structures a software application as a collection of loosely coupled services. In a microservices architecture, the loosely coupled services are fine-grained services and their communication protocols are lightweight. Consequently, a microservice may be a part of a software application which provides assistance to a user and is coupled with other parts of the software application which can provide related assistance to the user. Decomposing a software application into smaller services improves modularity, which makes the software application easier to understand, develop, and test. Since the cloud components 120-134 are invoked as microservices, rather than invoked as a large application that incorporates all of these services, the system 100 can efficiently scale out only the services that need to be increased without scaling out services that do not need to be increased, as each of these services can function independently at any scale.

FIG. 1 depicts the system 100 with four clients 102-108, one server 110, one cloud computing environment 112, one network 114, four data visualization platform components 116-122, three data source services 124-128, three gateway/REST API's 130-134, and seven data sources/factories 136-148. However, the system 100 may include any number of clients 102-108, any number of servers 110, any number of cloud computing environment 112, any number of network 114, any number of data visualization platform components 116-122, any number of data source services 124-128, any number of gateway/REST API's 130-134, and any number of data sources/factories 136-148.

The data visualization platform application 116 responds to a platform user's query for data, metadata, group, or discovery by forwarding the query to the data visualization platform representational state transfer (REST) application programming interface (API) 120 for the data source services 124, 126, and/or 128. The data visualization platform REST API 120 forwards the query, which can include tags that identify internal and/or external data source provider information, to the high-level retrieval 122 (service). Based on the data source(s) identified by the tag(s), the high-level retrieval 122 (service) can direct a single query to a single data source or split a single query into multiple queries that are directed to multiple data sources. Upon receiving the streamed content response(s) to the user's query, the high-level retrieval 122 (service) processes the streamed content response(s) as needed, such as by using the corresponding times to merge data streams. Then the high-level retrieval 122 (service) can return the processed streamed content response(s) with skip token support to the caller, which in this case is the data visualization platform REST API 120. Then the data visualization platform REST API 120 forwards the processed streamed content response(s) to the client 102 which initiated the platform user's query. The processed streamed content response(s) has the same data structure, irrespective of whether any external data source providers were queried so that the client 102 can use the data visualization platform application 116 to process the response in the same way for visualization and to perform analysis.

Use cases for the data visualization platform application 116 include data visualization, data analytics, and data subscription. In a data visualization example, the AVEVA data visualization framework issues a data query to the data visualization platform REST API 120, which forwards the query to the high-level retrieval 122 (service), which retrieves the streaming data from any of the queried data source services 124-128, processes the streaming data, and returns the streaming data as the response to the query. In a data analytics example, the AVEVA analytics modules issue a data query to the data visualization platform REST API 120, which forwards the query to the high-level retrieval 122 (service), which retrieves the streaming data from any of the queried data source services 124-128, processes the streaming data to provide the required analysis of the streaming data, and returns the analyzed streaming data as the response to the query.

In a data subscription example, the AVEVA data subscription service has subscribed to any of the data source providers to pull data changes, and then issues a data subscription pull query to the data visualization platform REST API 120, which forwards the query to the high-level retrieval 122 (service), which pulls the streaming changed subscription data from any of the queried data source services 124-128, processes the streaming changed subscription data, and returns the streaming changed subscription data as the response to the query. If the AVEVA data subscription service has subscribed to the external data source services 126 and/or 128 to push data changes, no query is required because the external data source services 126 and/or 128 will push the changed data to the high-level retrieval 122 (service) when the data changes. Then the AVEVA data subscription service uploads the data changes to an event hub and redistribution cache for condition monitoring and graphics functionality, respectively.

In an embodiment, the endpoint for a data query is api/externalData/DataHub/v1/Data/Query and the method for the data query is post. Likewise, the endpoint for a metadata query is api/externalData/DataHub/v1/Metadata/Query and the method for the metadata query is post. The request payload for a metadata query results in a response that returns metadata like tag type, data type, interpolation mode, engineering unit, etc. The endpoint for a groups query is api/externalData/DataHub/v1/Groups/Query, and the method for the groups query is post. The request payload for a groups query results in a response that returns query groups based on retrieval mode support by external data source provider API's. The endpoint for a discovery query is api/externalData/DataHub/v1/Discovery, the method for the discovery query is get, and a request payload for a discovery query results in a response that returns an external data source provider's discovery information, such as supported retrieval modes.

All the endpoints for these queries return the appropriate error message with details in case of failures. The endpoints also return the skip-tokens in a smart process, even when tags are from multiple data sources in a single query. For example, if the query responses are limited to 5,000 data points per response, and a user has submitted a query that requires 1,000,000 data points, the endpoints will divide the streaming content for the query response into 200 responses of 5,000 data points per response, with each response separated by a skip token, which functions as a delimiter, even if the responses are from multiple data sources. The high-level retrieval 122 (service) is intelligent enough to identify which data points in which responses are from which data sources and therefore need to be merged together.

Figure 2:
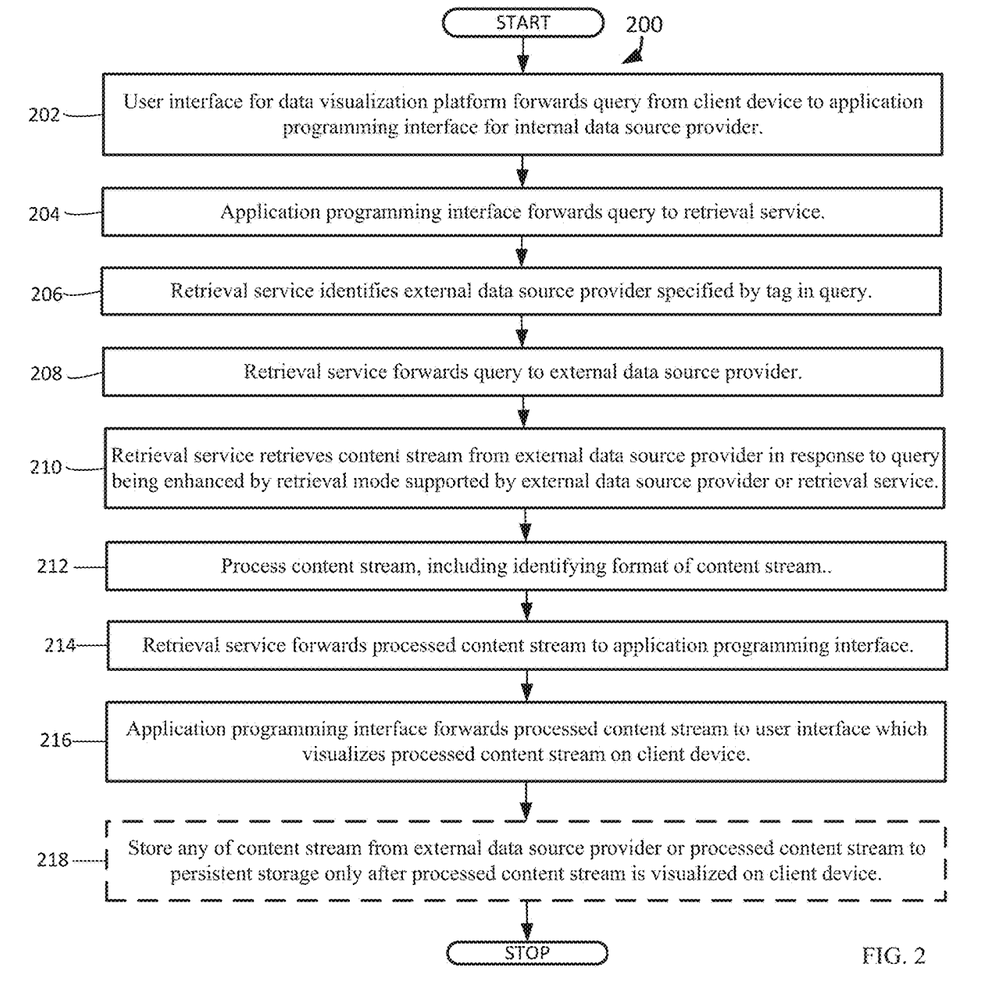
FIG. 2 is a flowchart that illustrates a computer-implemented method for visualizing data provided by external sources, under an embodiment.

FIG. 2 is a flowchart that illustrates a computer-implemented method for visualizing data provided by external sources, under an embodiment. Flowchart 200 depicts method acts illustrated as flowchart blocks for certain actions involved in and/or between the system elements 102-134 of FIG. 1.

A user interface, for a data visualization platform, forwards a query from a client to an application programming interface for an internal data source provider, block 202. The system forwards a user's query to an application programming interface. For example, and without limitation, this can include the client 102 receiving a query from a BigBiz executive for the values of some of the time series data points from Acme's factory 146 via the data visualization platform user interface 118, which receives the query for the Acme factory data, and forwards the query to the data visualization platform REST API 120, which is used to query the AVEVA back-end historian 130, which is accessed via the internal data source service 124.

A user interface can be the means by which a human and a computer system interact, in particular the input devices and software that interact with a human. A data visualization platform can be a combination of hardware and/or software that collects information from sources, and creates easy-to-understand displayed representations of the information to assist users to quickly understand the information. A query can be a request for specific information. A client can be computer hardware and software that requests access to a service provided by a server. An application programming interface can be the software for two or more computer programs or components to communicate with each other. An internal data source provider can be a supplier of values of variables which are inside a system.

A query may be for data, metadata, a group, a discovery, and/or any changes in subscribed data. For example, the data visualization platform application 116 can first submit a discovery query to the external data source service 126 for Acme's factory data to determine how to optimize data queries for Acme's factory data, then submits a query for some of the data and metadata from Acme's DataHub historian 132, and also submits a query to subscribe to any changes in the data queried from Acme's DataHub historian 132.

Data can be a set of values of qualitative or quantitative variables. Metadata can be information about other information. A group can be a number of things that are located close together or are considered or classed together. A discovery can be the act or the process of identifying information. Any change can be a modification, deletion, or addition. Subscribed data can be a set of values of qualitative or quantitative variables that are arranged to be received regularly.

The data visualization platform REST API 120 may be implemented as a microservice in the cloud computing environment 112. A microservice can be an architectural style that structures an application as a collection of executable code for assistance that are independently deployable and loosely coupled. A cloud computing environment can be a platform that provides an on-demand availability of computer system resources without direct active management by a user of the computer system resources.

After receiving a query, an application programming interface forwards the query to a retrieval service, block 204. The system forwards a query from an API to a retrieval service. By way of example and without limitation, this can include the data visualization platform REST API 120 forwarding the query for the Acme factory data to the high-level retrieval 122 (service). A retrieval service can be a process of assisting in getting something back from somewhere. The high-level retrieval 122 (service) may be implemented as a microservice in the cloud computing environment 112.

Following receipt of a query, a retrieval service identifies an external data source provider specified by a tag in the query, block 206. The system identifies the external data source targeted by a query. In embodiments, this can include the high-level retrieval 122 (service) identifying Acme's DataHub historian 132, which is accessed via the external data source service for DataHub 126, specified by a tag in the query for the Acme factory data. An external data source provider can be a supplier of values of variables which are outside a system. A tag can be a label attached to something for the purpose of identification or to give other information.

Identifying an external data source provider specified by a tag may include identifying multiple data source providers specified by multiple tags in the query. For example, the high-level retrieval 122 (service) responds to a query that includes a tag for internal data and another tag for external data by splitting the query into one query for the internal data source service 124 and another query for the external data source service for DataHub 126, respectively. A plurality can be the fact or state of being multiple.

Having identified an external data source provider targeted by a query, a retrieval service forwards the query to the external data source provider, block 208. The system forwards a query to the intended external data source. For example, and without limitation, this can include the high-level retrieval 122 (service) forwarding the query for the Acme factory data to the Acme's DataHub historian 132, which is accessed via the external data source service for DataHub 126.

Forwarding the query to the external data source provider can include optimizing the query based on retrieval information which is discovered from the external data source provider. For example, the high-level retrieval 122 (service) submitted a discovery query to discover the contract/specification information for the external data source provider for Acme Corporation, which specified what Acme's DataHub historian 132 supports, such as the supported retrieval modes. The contract/specification information that was discovered for Acme's DataHub historian 132, includes a list of specific tags for the Acme factory data which store their retrievable information within a first partition and a list of the remainder of the tags for the Acme factory data which store their retrievable information within a second partition. Consequently, the high-level retrieval 122 (service) optimizes the query for some of the Acme factory data by splitting the query into a first query that requests a group of data that is stored within the first partition and a second query that requests a group of data that is stored within the second partition. Although this query optimization describes an optimization based on grouping of data, this grouping is only an example, and many other option for optimizing queries based on retrieval information discovered from an external data source contract/specification will become apparent to one skilled in the art.

After forwarding a query to its intended external data source provider, the retrieval service retrieves a content stream from the external data source provider in response to the query being enhanced by a retrieval mode supported by the external data source provider or the retrieval service, block 210. The system retrieves streaming content for a query enhanced by a retrieval mode. By way of example and without limitation, this can include the high-level retrieval 122 enhancing the capability of the query by implementing the integral retrieval mode while retrieving a data stream for the Acme factory data from Acme's DataHub historian 132 because analysis of Acme's contract/specification indicates that Acme's DataHub historian 132 does not support the integral retrieval mode.

A content stream can be a sequence of elements made available over time. A response can be a reply to a query. A retrieval mode can be a method of assisting in getting something back from somewhere.

Sending the query to the external data source provider may include sending multiple queries to multiple data source providers specified by multiple tags. For example, since a query includes a tag for internal data and another tag for external data, the high-level retrieval 122 (service) splits the query into two queries, and sends one query to the internal data source service 124 and sends another query for the external data source service for DataHub 126, respectively.

The content stream may include a data stream, a metadata stream, a group stream, a discovery stream, and/or a stream of any changes in subscribed data. For example, the data visualization platform application 116 can receive a discovery stream in response to submitting a discovery query to the external data source service for DataHub 126 for Acme's factory data to determine how to optimize data queries for Acme's factory data, then receives a data stream and a metadata stream in response to submitting a query for some of the data and metadata from Acme's DataHub historian 132, and also receive a stream of any changes in subscribed data in response to submitting a query to subscribe to any changes in the data queried from Acme's DataHub historian 132.

A data stream can be a sequence of information elements made available over time. A metadata stream can be a sequence of elements that provide information about other information made available over time. A group stream can be a sequence of elements about a number of things that are located close together or are considered or classed together, and are made available over time. A discovery stream can be a sequence of elements made available over time and which are an act or the process of identifying information. A stream can be a sequence of elements made available over time.

Retrieving a content stream from an external data source provider may include retrieving multiple content streams from multiple corresponding data source providers. For example, the high-level retrieval 122 (service) can retrieve a data stream for time series data points from the internal data source service 124 and a data stream for time series data points from the external data source service for DataHub 126.

Following receipt of a content stream, a retrieval service processes the content stream by identifying a format of the content stream, block 312. The system identifies the format of the external data so that the external data can be processed the same as internal data. In embodiments, this can include the high-level retrieval 122 (service) processing the data stream for the Acme factory data by identifying the format of the data points in the data stream for the Acme factory data. A format can be the arrangement of and relations between the parts or elements of something complex.

Processing a content stream by identifying the format of the content stream may include processing multiple content streams by identifying the format of at least one of the multiple content streams, and merging the multiple content streams into the content stream that is merged based on time. For example, the high-level retrieval 122 (service) identifies the format of the data points in the data stream for the Acme factory data, and then merges the data stream from the internal data source service 124 and the data stream for the Acme factory data from the external data source service for DataHub 126, into a merged data stream based on their corresponding times. Time can be a chronological measure expressed in hours and/or minutes past midnight or noon.

Having processed a content stream, a retrieval service sends the processed content stream to an application programming interface, block 314. The system forwards a processed content stream to an application programming interface. For example, and without limitation, this can include the high-level retrieval 122 (service) forwarding the format-identified data stream for the Acme factory data to the data visualization platform REST API 120.

After receiving a processed content stream, an application programming interface forwards the processed content stream to a user interface, which visualizes the processed content stream on a client, block 316. The system forwards the queried content stream to a user. By way of example and without limitation, this can include the data visualization platform REST API 120 forwarding the identified data stream for the Acme factory data to the data visualization platform user interface 118, which visualizes the data stream for the Acme factory data on the client 102 for the BigBiz executive. The visualized data stream for the Acme factory data enables the BigBiz executive to analyze all the data required to make a well-informed evaluation of whether to purchase and operate Acme's factory.

Only after the processed content stream is visualized on a client, the content stream from the external data source provider and/or the processed content stream is optionally stored to persistent storage, block 218. The system can store some to all of the content stream for long-term storage, but only if the content stream to be stored has already been visualized. In embodiments, this can include the client 102 for the BigBiz executive visualizing the analyzed data stream for the Acme factory data, offering an option to save some of the visualized data, and then storing some of the analyzed data stream for the Acme factory data which the BigBiz executive selected to be stored to the persistent storage of the server 110, which can assist in the evaluation of whether to purchase the Acme factory. Persistent storage can be any data retention device that retains data after power to the device is shut off.

Although FIG. 2 depicts the blocks 202-218 occurring in a specific order, the blocks 202-218 can occur in another order. In other implementations, each of the blocks 202-218 can also be executed in combination with other blocks and/or some blocks may be divided into a different set of blocks.

Figure 3:
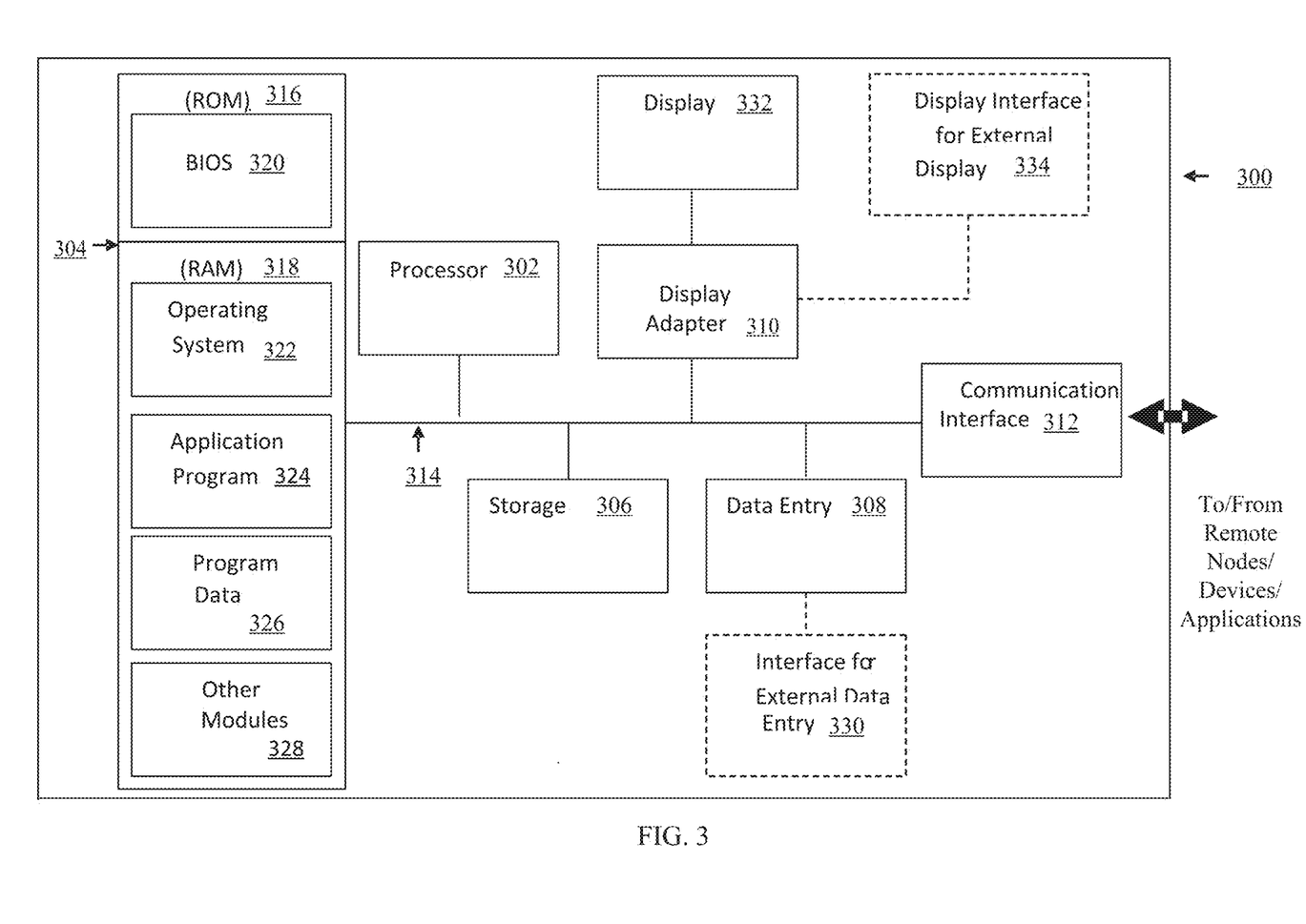
FIG. 3 is a block diagram illustrating an example hardware device in which the subject matter may be implemented.

An exemplary hardware device in which the subject matter may be implemented shall be described. Those of ordinary skill in the art will appreciate that the elements illustrated in FIG. 3 can vary depending on the system implementation. With reference to FIG. 3, an exemplary system for implementing the subject matter disclosed herein includes a hardware device 300, including a processing unit 302, a memory 304, a storage 306, a data entry module 308, a display adapter 310, a communication interface 312, and a bus 314 that couples elements 304-312 to the processing unit 302.

The bus 314 can comprise any type of bus architecture. Examples include a memory bus, a peripheral bus, a local bus, etc. The processing unit 302 is an instruction execution machine, apparatus, or device and can comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 406 and/or received via the data entry module 308.

The memory 304 can include a read only memory (ROM) 316 and a random-access memory (RAM) 318. The memory 304 may be configured to store program instructions and data during operation of the hardware device 300. In various embodiments, the memory 304 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 can also include nonvolatile memory technologies such as nonvolatile flash RAM (NVRAM) or ROM. In some embodiments, it is contemplated that the memory 304 can include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user can enter commands and information into the hardware device 300 through data entry module 308. The data entry module 308 can include mechanisms such as a keyboard, a touch screen, a pointing device, etc.

Other external input devices (not shown) are connected to the hardware device 300 via an external data entry interface 310. By way of example and not limitation, external input devices can include a microphone, joystick, game pad, satellite dish, scanner, or the like. In some embodiments, external input devices can include video or audio input devices such as a video camera, a still camera, etc. The data entry module 308 may be configured to receive input from one or more users of the hardware device 300 and to deliver such input to the processing unit 302 and/or the memory 304 via the bus 314.

A display 312 is also connected to the bus 314 via the display adapter 310. The display 312 may be configured to display output of the hardware device 300 to one or more users. In some embodiments, a given device such as a touch screen, for example, can function as both the data entry module 308 and the display 312. External display devices can also be connected to the bus 314 via the external display interface 334. Other peripheral output devices, not shown, such as speakers and printers, may be connected to the hardware device 300.

The hardware device 300 can operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 can interface with a wireless network and/or a wired network. Examples of wireless networks include, for example, a BLUETOOTH network, a wireless personal area network, a wireless 802.21 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 can include logic configured to support direct memory access (DMA) transfers between the memory 404 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for visualizing data provided by external sources, the system comprising:
   one or more processors; and
   a non-transitory computer readable medium storing a plurality of instructions, which when executed, cause the one or more processors to:

forward, by a user interface for a data visualization platform, a query from a client to an application programming interface for an internal data source provider;

forward, by the application programming interface, the query to a retrieval service;

identify, by the retrieval service, an external data source provider specified by a tag in the query;

forward, by the retrieval service, the query to the external data source provider;

retrieve, by the retrieval service, a content stream from the external data source provider in response to the query being enhanced by a retrieval mode supported by one of the external data source provider or the retrieval service;

process, by the retrieval service, the content stream, including identifying a format of the content stream;

forward, by the retrieval service, the processed content stream to the application programming interface; and forward, by the application programming interface, the processed content stream to the user interface, which visualizes the processed content stream on the client.

2. The system of claim 1, wherein the query is for at least one of data, metadata, a group, a discovery, or any changes in subscribed data, and the content stream comprises at least one of a data stream, a metadata stream, a group stream, a discovery stream, and a stream of any changes in subscribed data.

3. The system of claim 1, wherein the application programming interface and the retrieval service are each implemented as corresponding microservices in a cloud computing environment.

4. The system of claim 1, wherein identifying an external data source provider specified by a tag comprises identifying a plurality of data source providers specified by a plurality of tags in the query, and forwarding the query to the external data source provider comprises forwarding a plurality of queries to the plurality of data source providers specified by the plurality of tags.

5. The system of claim 1, wherein forwarding the query to the external data source provider comprises optimizing the query based on retrieval information which is discovered from the external data source provider.

6. The system of claim 1, wherein retrieving the content stream from the external data source provider comprises retrieving a plurality of content streams from a corresponding plurality of data source providers, and wherein processing the content stream including identifying the format of the content stream comprises identifying the format of at least one of the plurality of content streams and merging the plurality of content streams into the content stream that is merged based on time.

7. The system of claim 1, wherein plurality of instructions further causes the processor to store at least one of any of the content stream from the external data source provider or the processed content stream to persistent storage only after the processed content stream is visualized on the client.

8. A computer-implemented method for visualizing data provided by external sources, the computer-implemented method comprising:

forwarding, by a user interface for a data visualization platform, a query from a client to an application programming interface for an internal data source provider;

forwarding, by the application programming interface, the query to a retrieval service;

identifying, by the retrieval service, an external data source provider specified by a tag in the query;

forwarding, by the retrieval service, the query to the external data source provider;

retrieving, by the retrieval service, a content stream from the external data source provider in response to the query being enhanced by a retrieval mode supported by one of the external data source provider or the retrieval service;

processing, by the retrieval service, the content stream, including identifying a format of the content stream;

forwarding, by the retrieval service, the processed content stream to the application programming interface; and forwarding, by the application programming interface, the processed content stream to the user interface, which visualizes the processed content stream on the client.

9. The computer-implemented method of claim 8, wherein the query is for at least one of data, metadata, a group, a discovery, or any changes in subscribed data, and the content stream comprises at least one of a data stream, a metadata stream, a group stream, a discovery stream, and a stream of any changes in subscribed data.

10. The computer-implemented method of claim 8, wherein the application programming interface and the retrieval service are each implemented as corresponding microservices in a cloud computing environment.

11. The computer-implemented method of claim 8, wherein identifying an external data source provider specified by a tag comprises identifying a plurality of data source providers specified by a plurality of tags in the query, and forwarding the query to the external data source provider comprises forwarding a plurality of queries to the plurality of data source providers specified by the plurality of tags.

12. The computer-implemented method of claim 8, wherein forwarding the query to the external data source provider comprises optimizing the query based on retrieval information which is discovered from the external data source provider.

13. The computer-implemented method of claim 8, wherein retrieving the content stream from the external data source provider comprises retrieving a plurality of content streams from a corresponding plurality of data source providers, and wherein processing the content stream including identifying the format of the content stream comprises identifying the format of at least one of the plurality of content streams and merging the plurality of content streams into the content stream that is merged based on time.

14. The computer-implemented method of claim 8, wherein the computer-implemented method further comprises storing at least one of any of the content stream from the external data source provider or the processed content stream to persistent storage only after the processed content stream is visualized on the client.

15. A computer program product, comprising a non-transitory computer-readable medium having a computer-readable program code embodied therein to be executed by one or more processors, the program code including instructions to:

forward, by a user interface for a data visualization platform, a query from a client to an application programming interface for an internal data source provider;

forward, by the application programming interface, the query to a retrieval service;

identify, by the retrieval service, an external data source provider specified by a tag in the query;

forward, by the retrieval service, the query to the external data source provider;

retrieve, by the retrieval service, a content stream from the external data source provider in response to the query being enhanced by a retrieval mode supported by one of the external data source provider or the retrieval service;

process, by the retrieval service, the content stream, including identifying a format of the content stream;

forward, by the retrieval service, the processed content stream to the application programming interface; and forward, by the application programming interface, the processed content stream to the user interface, which visualizes the processed content stream on the client.

16. The computer program product of claim 15, wherein the query is for at least one of data, metadata, a group, a discovery, or any changes in subscribed data, and the content stream comprises at least one of a data stream, a metadata stream, a group stream, a discovery stream, and a stream of any changes in subscribed data.

17. The computer program product of claim 15, wherein the application programming interface and the retrieval service are each implemented as corresponding microservices in a cloud computing environment.

18. The computer program product of claim 15, wherein identifying an external data source provider specified by a tag comprises identifying a plurality of data source providers specified by a plurality of tags in the query, forwarding the query to the external data source provider comprises forwarding a plurality of queries to the plurality of data source providers specified by the plurality of tags, retrieving the content stream from the external data source provider comprises retrieving a plurality of content streams from a corresponding plurality of data source providers, and processing the content stream including identifying the format of the content stream comprises identifying the format of at least one of the plurality of content streams and merging the plurality of content streams into the content stream that is merged based on time.

19. The computer program product of claim 15, wherein forwarding the query to the external data source provider comprises optimizing the query based on retrieval information which is discovered from the external data source provider.

20. The computer program product of claim 15, wherein the program code includes further instructions to store at least one of any of the content stream from the external data source provider or the processed content stream to persistent storage only after the processed content stream is visualized on the client.

* * * * *